(No Model.)
M. D. SMALLEY.
BICYCLE.
No. 472,487. Patented Apr. 5, 1892.
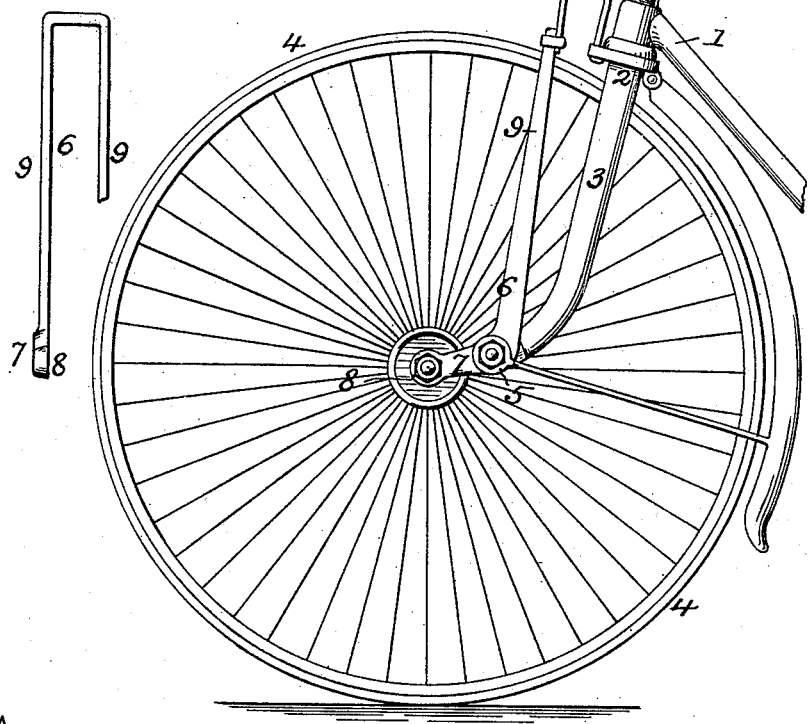
ATTEST:
Geo H. Arthur
Henry W. A. Nott
INVENTOR:
Martin D. Smalley,
by Robert S. Burns
Attorney.

UNITED STATES PATENT OFFICE.

MARTIN D. SMALLEY, OF CHICAGO, ILLINOIS.

BICYCLE.

SPECIFICATION forming part of Letters Patent No. 472,487, dated April 5, 1892.

Application filed July 6, 1891. Serial No. 398,590. (No model.)

*To all whom it may concern:*

Be it known that I, MARTIN D. SMALLEY, a citizen of the United States, residing at Chicago, in the county of Cook and State of Illinois, have invented a certain new and useful Improvement in Bicycles; and I do hereby declare the following to be a full, clear, and exact description of the same, reference being had to the accompanying drawings, forming a part of this specification.

The present invention relates to that type of Safety bicycles in which means are provided for affording a yielding elasticity between the seat-carrying frame and the front or steering wheel of a bicycle or like vehicle, so as to afford greater ease and comfort in riding, the object of the present improvement being to provide a simple, cheap, and durable spring-fork construction embodying the features of ample strength and lightness combined with a very uniform and even resilient action of the interposed spring. I attain such object by the construction and arrangment of parts illustrated in the accompanying drawings, in which—

Figure 1 is a side view of the front portion of a bicycle embodying my present improvement, and Fig. 2 a detail front elevation of the wheel member of the spring-fork.

Similar numerals of reference indicate like parts in both views.

Referring to the drawings, 1 represents a portion of the main frame carrying the steering-post 2, of any usual construction, the lower portion 3 of which is forked to straddle the front or steering wheel 4, and form journal-eyes 5 for the attachment of the swinging forked member 6, which is of a bent or angular formation, the forwardly-curved counterpart lower ends or arms 7 thereof being provided with journal-eyes 8 for the axles of the front or steering wheel, as shown.

The counterpart main shanks 9 of the swinging forked member 6 slope upwardly in an oblique direction to the main forks 3 and at their upper connected ends are united to the main forks preferably by a pair of U-shaped springs 10, the ends of which are clipped or otherwise attached to the upper end of the swinging forked member 6 and to the steering-post 2. In some cases a single spring may be employed with good results. The dual arrangement thereof is preferred on account of the greater uniformity in the elasticity afforded.

Having thus fully described my said invention, what I claim as new, and desire to secure by Letters Patent, is—

A spring-fork for bicycles, &c., comprising, in combination, a main steering forked member 2 3, curved forwardly and having journals at its lower ends, a swinging forked member journaled thereto and having a bent or angle formation, with its straight portions extended up in front of the main fork 3 in an approximately parallel direction thereto and its bent portions extending forwardly and provided at their ends with journals for the steering-wheel, and a U-shaped spring 10, interposed between the upper end of the swinging forked member and the main steering member, as and for the purpose set forth.

In testimony whereof witness my hand this 1st day of July, 1891.

MARTIN D. SMALLEY.

In presence of—
 ROBERT BURNS,
 GEO. H. ARTHUR.